May 23, 1950  A. F. ECKEL  2,509,185
TELEMETERING DEVICE FOR TESTING SURFACES
Filed April 12, 1945  8 Sheets-Sheet 1

INVENTOR.
Arthur F. Eckel
BY
Loftus, Moore, Olson & Trexler
attys.

May 23, 1950 A. F. ECKEL 2,509,185
TELEMETERING DEVICE FOR TESTING SURFACES
Filed April 12, 1945 8 Sheets-Sheet 2
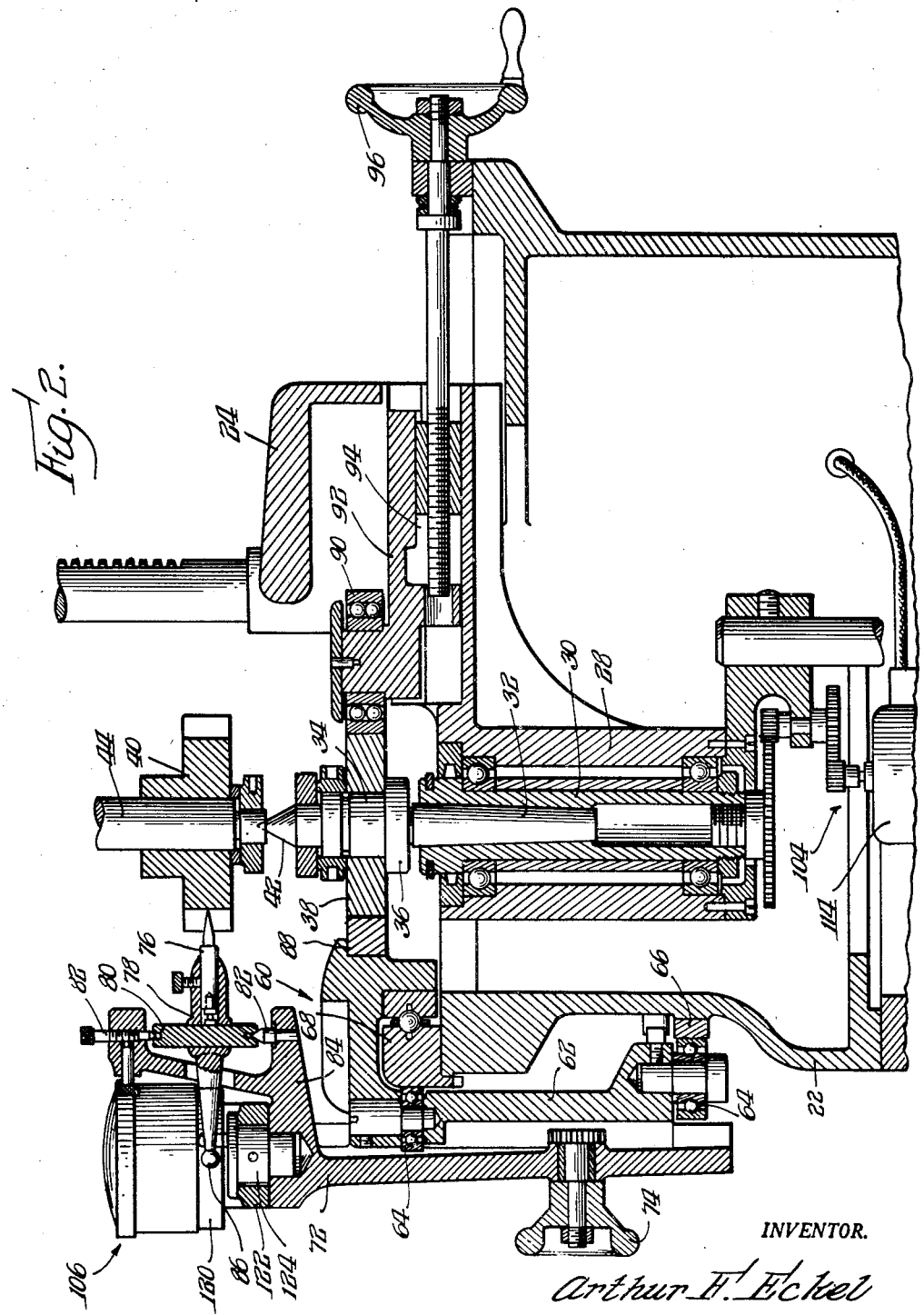
INVENTOR.
Arthur F. Eckel
By Loftus, Moore, Olson & Trexler
attys.

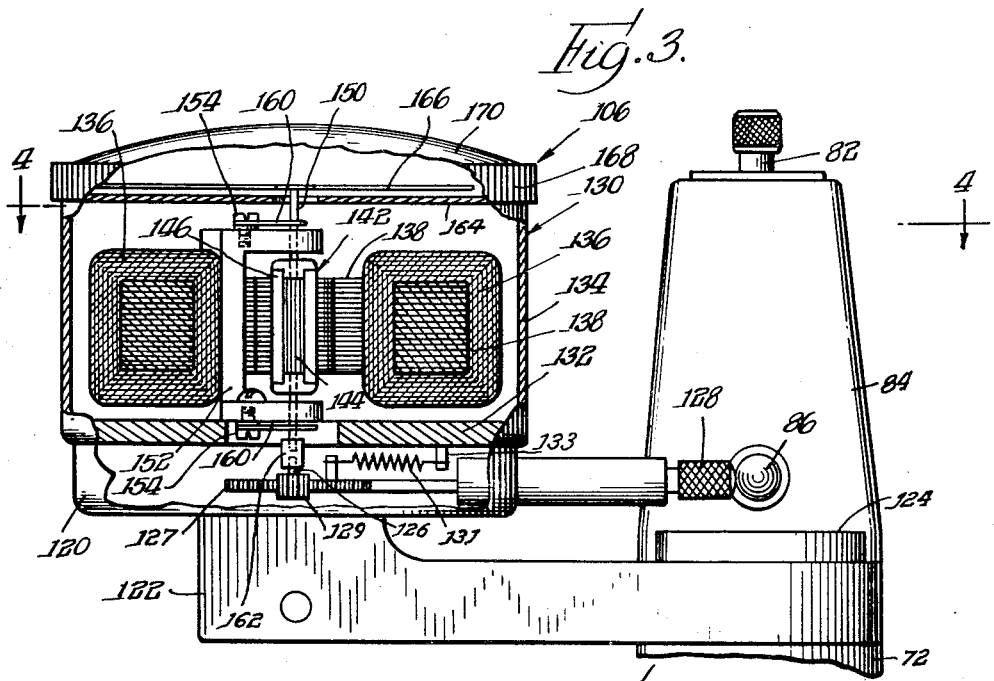
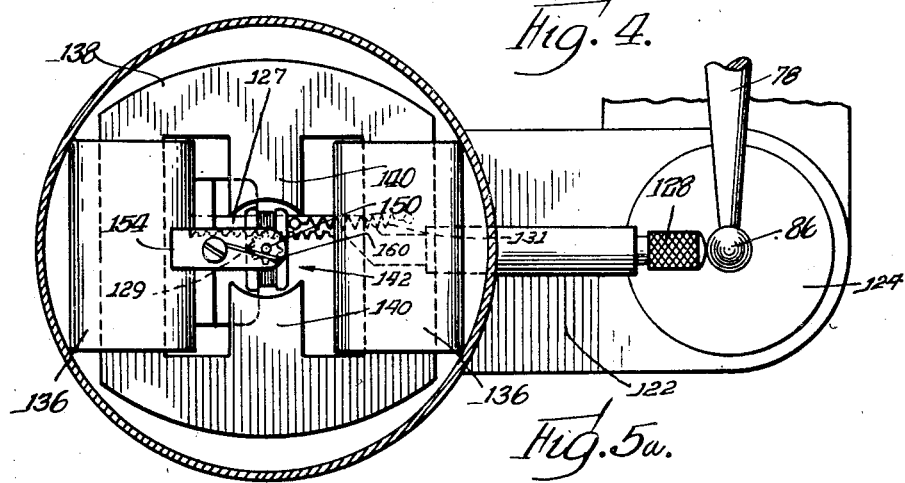
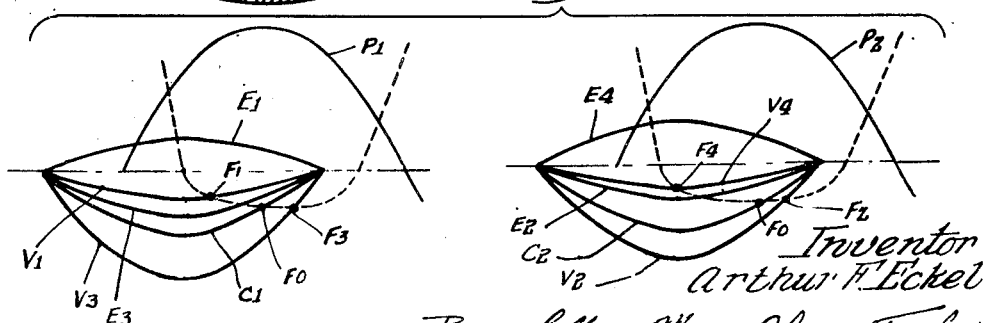

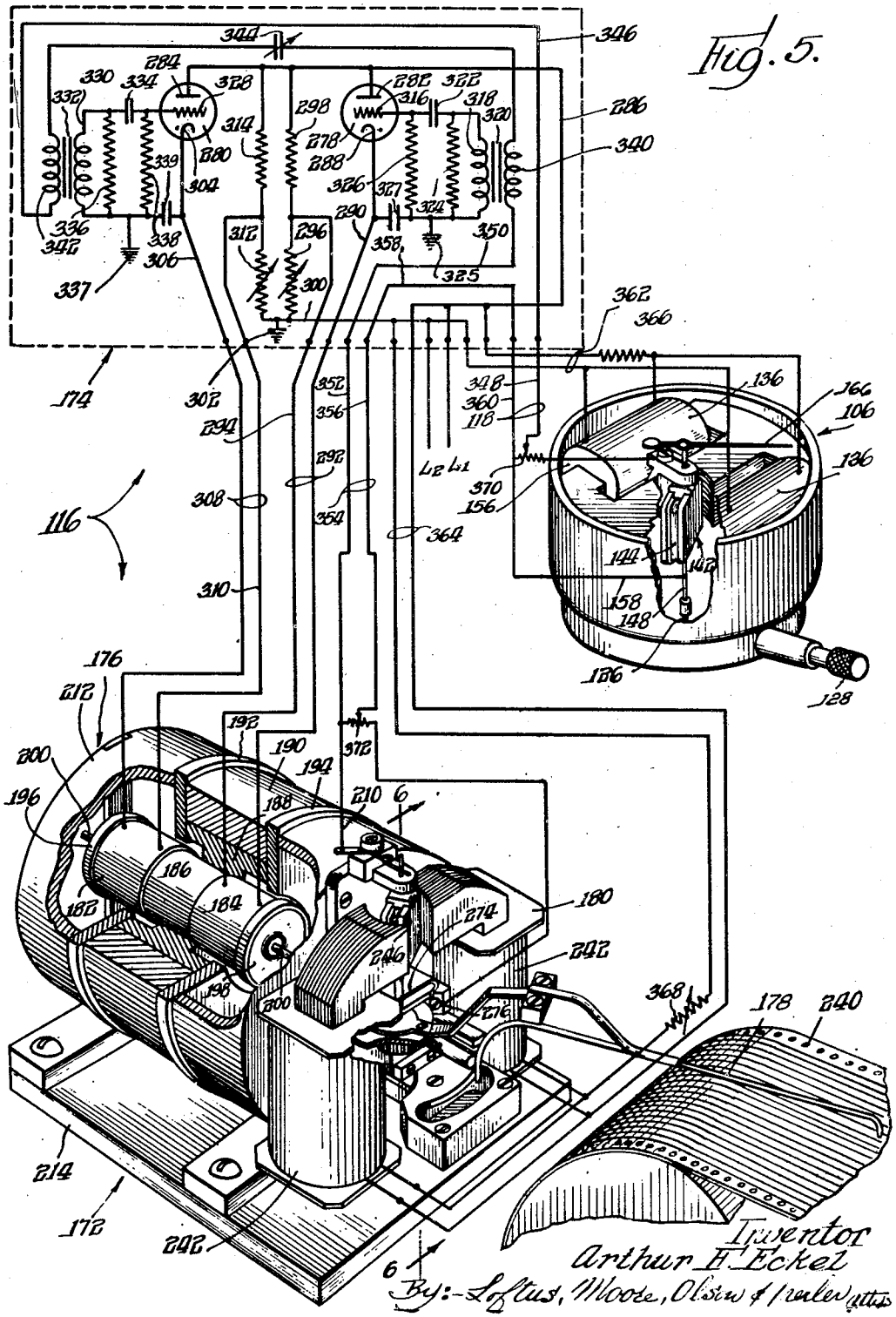

May 23, 1950  A. F. ECKEL  2,509,185
TELEMETERING DEVICE FOR TESTING SURFACES
Filed April 12, 1945  8 Sheets-Sheet 5

INVENTOR.
Arthur F. Eckel
BY
Lyttus Moore, Olson & Trexler
attys.

May 23, 1950 A. F. ECKEL 2,509,185
TELEMETERING DEVICE FOR TESTING SURFACES
Filed April 12, 1945 8 Sheets-Sheet 6
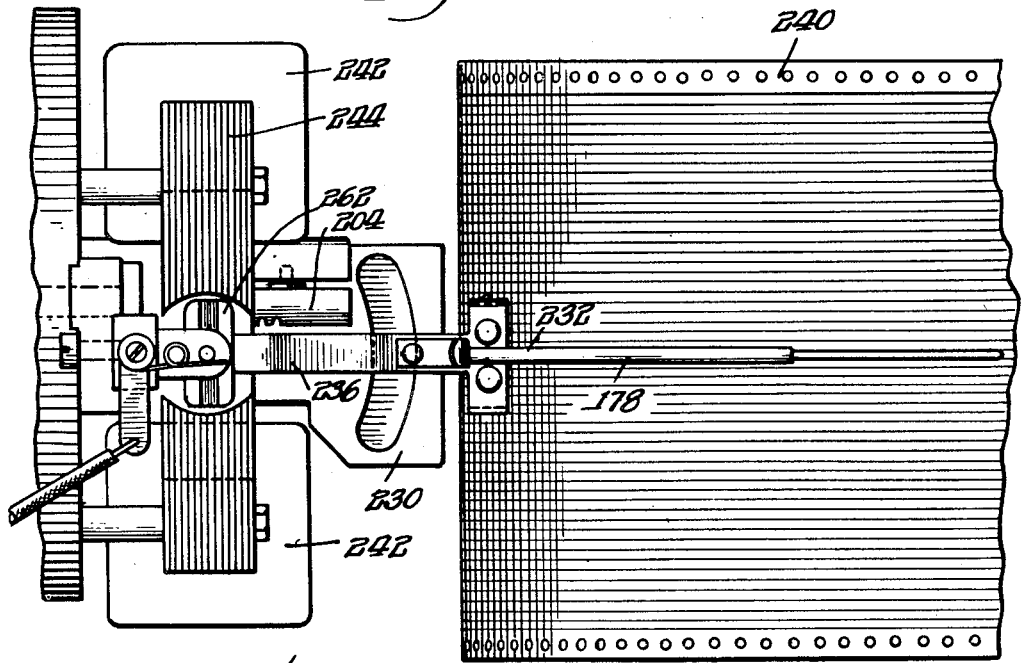
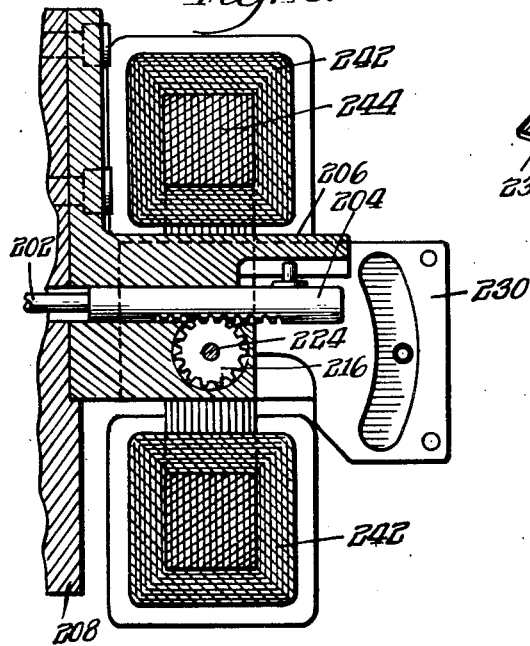
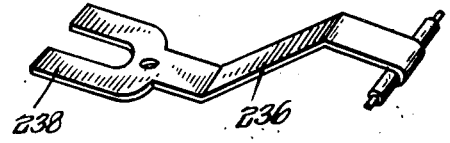
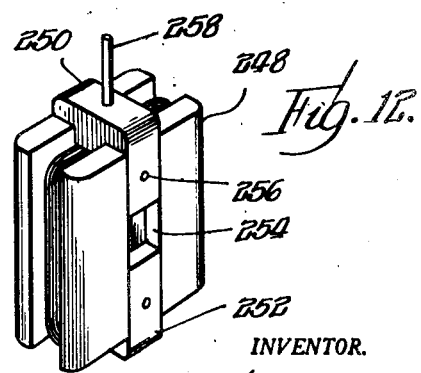
INVENTOR.
Arthur F. Eckel
By Loftus, Moore, Olson & Trexler
attys

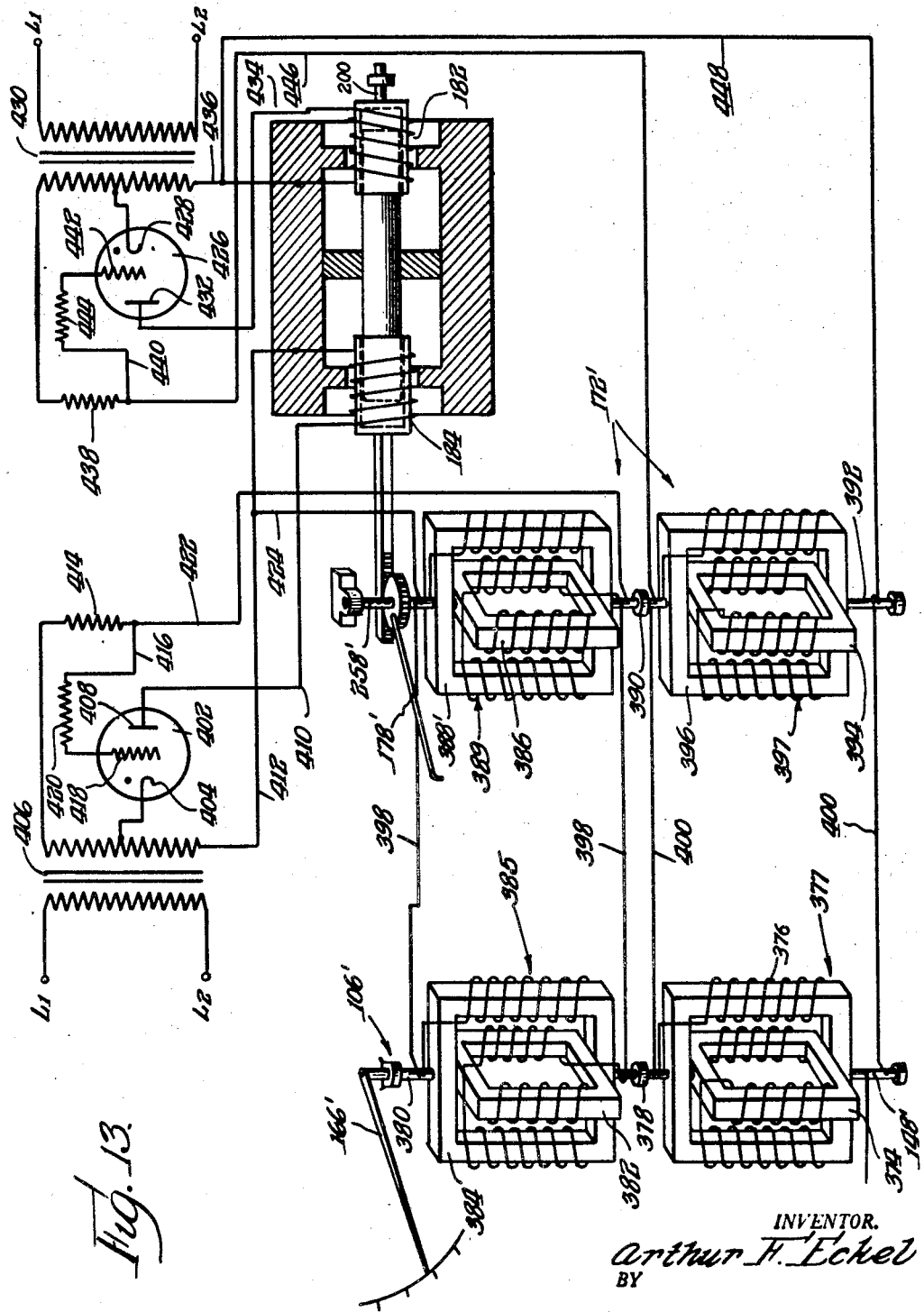

May 23, 1950 A. F. ECKEL 2,509,185
TELEMETERING DEVICE FOR TESTING SURFACES
Filed April 12, 1945 8 Sheets-Sheet 8

INVENTOR.
Arthur F. Eckel
BY
Loftus, Moore, Olson & Trexler
attys

Patented May 23, 1950

2,509,185

UNITED STATES PATENT OFFICE 2,509,185

TELEMETERING DEVICE FOR TESTING SURFACES

Arthur F. Eckel, Chicago, Ill., assignor to Illinois Tool Works, Chicago, Ill., a corporation of Illinois Application April 12, 1945, Serial No. 588,032

10 Claims. (Cl. 346—33)

This invention relates to an electric telemeter, and more particularly to a telemetric system and recorder for surface testing machines.

It is an object of this invention to provide a telemetric system or recorder which is relatively simple in construction, and hence relatively inexpensive, and at the same time more rugged in character and more reliable and accurate in operation than systems and recorders heretofore known.

Telemetric recorders heretofore known have been either of the limited swing, fast response type, or of the large swing, slow response type. It is an object of this invention to provide a large swing, fast response type of telemetric recorder.

The invention, in one of its aspects, consists in the provision of a telemetric transmitter and a telemetric receiver or recorder interconnected in such manner that the instantaneous value of the force applied to the indicator or driven element of the receiver is determined by the instantaneous value of the angular difference between the position of the moving or gauging element of the transmitter and the position of the driven or indicating element of the receiver so that the rate of movement of the last mentioned element of the receiver shall be determined by the rate of movement of the moving or gauging element of the transmitter, and the response time of the system substantially the same as the response time of the transmitter.

The invention further consists in the provision of a telemetric recorder having a coil of an electric generator of variable ratio transformer associated with the pen of the recorder and with the telemetric transmitter in such manner that the position of the recorder pen determines the value of the voltage generated in the coil and that voltage is employed in combination with a voltage generated in a like coil of the transmitter to control the magnitude or duration of electric energy impulses supplied to opposed pen driving coils of the recorder so that the direction and instantaneous value of the force applied to the pen is determined by the direction and instantaneous value of the angular swing of the pen, and the pen thereby caused to respond substantially instaneously to the movement of the coil of the transmitter.

It is a further important feature of applicant's invention that overswing of the pen of the recorder is resisted by the application of a dynamic braking force which is a function of the angle of pen overswing.

The invention, in another of its aspects, consists in the provision of a telemetric recorder in which the pen is maintained at rest by instantaneously equal, and opposite forces, one of which is increased and the other decreased when movement of the pen is required, so that creeping of the pen is dynamically resisted and instantaneous response of the pen obtained.

Other and further objects and advantages of the invention will be apparent from the following description when taken in connection with the accompanying drawings, wherein:

Figure 2 is a fragmentary enlarged view in vertical section taken substantially along the line 2—2 of Figure 1;

Figure 3 is a view in elevation, partly broken away, of the telemetric, surface gauging transmitter;

Figure 4 is a view in horizontal section taken substantially along the line 4—4 of Figure 3;

Figure 5 is a diagrammatic illustration of the pen controlling unit of the telemetric recorder system of Figures 1 and 2;

Figure 5A is a voltage wave diagram illustrating the operation of the control unit of Figure 5;

Figure 9 is a fragmentary, top plan view of the pen driver shown in Figures 5 to 8;

Figure 10 is a fragmentary view in horizontal section taken substantially along the line 10—10 of Figure 6;

Figure 11 is a view in perspective of the pen mounting element of the pen driver shown in Figures 5 to 10;

Figure 12 is an enlarged view in perspective of the voltage generating coil forming part of the pen driver shown in Figures 5 to 11;

Figure 13 is a diagrammatic view of a modified form of the pen controlling telemeter unit.

Figure 1:
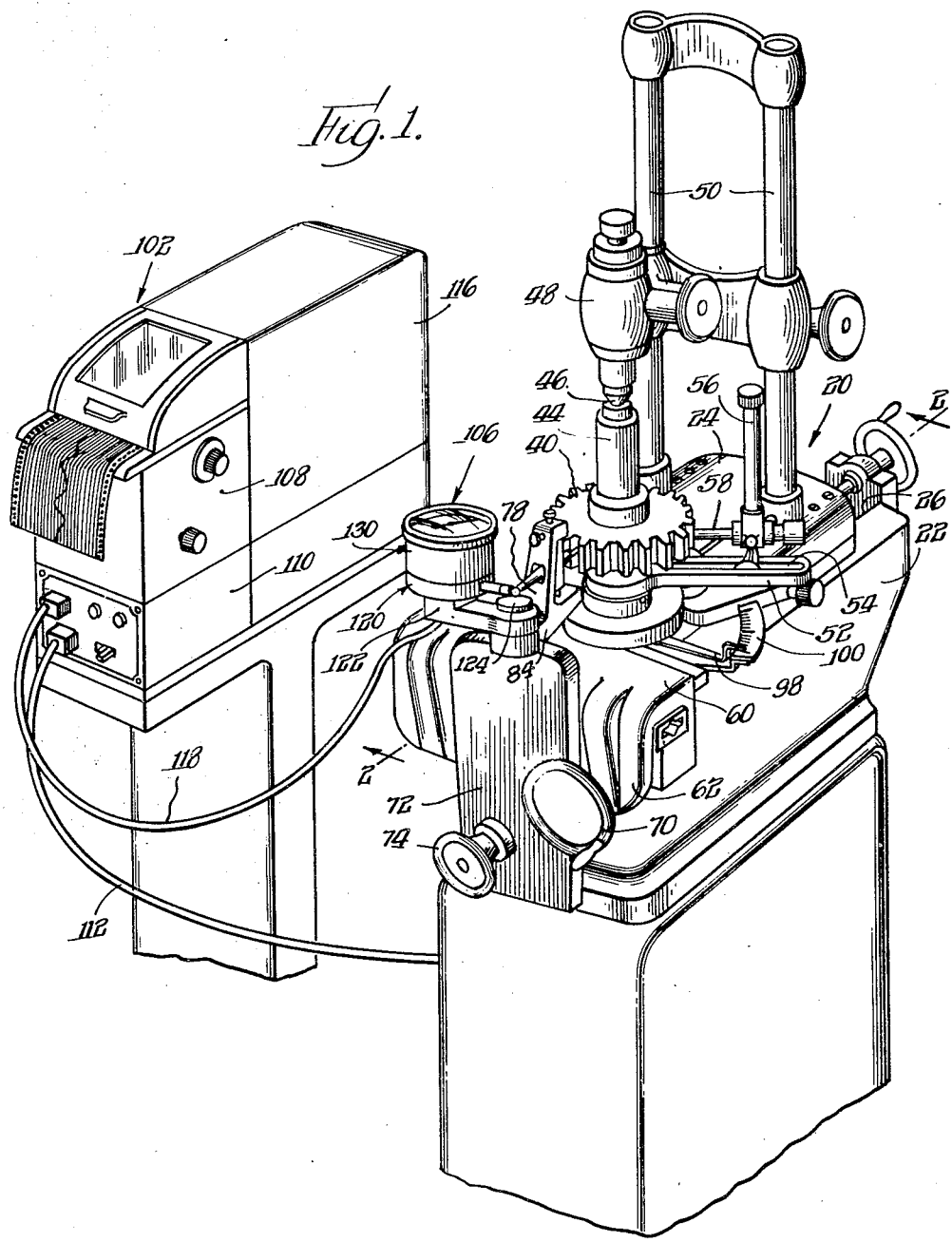
Figure 1 is a view in perspective of an involute gear testing machine provided with a telemetric recorder system embodying the invention.

In Figures 1 and 2 of the drawings, a telemetric recorder system embodying the invention is illustrated in association with a standard, involute tooth measuring or gear testing machine 20 which comprises a suitable base 22 upon which is mounted a slide frame 24. The frame 24 is slidable upon horizontal ways or tracks 26 at the upper edge of the base 22.

The frame 24 is formed with a depending section 28 (Figure 2) in which is journaled a sleeve 30. The sleeve receives the tapered shank 32 of a spindle 34 having an annular flange 36 to support a disk 38 which is of an external diameter equal to the diameter of the base circle of the gear 40 to be tested. The disk 38 is detachably mounted in a suitable manner on the spindle so that it may be readily replaced by a similar disk of a different size corresponding to a different size gear to be tested. The spindle 34 terminates near its upper end in a conical work support center 42 which receives the lower end of the gear or work supporting spindle 44. The upper end of the spindle 44 is received by the center 46 (Figure 1) of a tail stock 48 mounted for vertical adjustment on columns 50.

The base disk or cylinder 38 is coupled to the gear 40 to be tested by a lever 52 which is detachably clamped to the spindle 34. The arm of the lever is slotted, as at 54, to receive a post or rod 56 that is clamped to the lever for adjustment along the slot. The post 56 supports a vertically adjustable rod 58 that fits between the adjacent teeth of the gear 40 to be tested, as shown in Figure 1.

A frame 60 is slidably mounted upon the base 22 and is provided with a depending portion 62. This frame is provided with upper and lower roller bearings 64 (Figure 2) which roll upon bars 66 and 68 when the hand wheel 70 (Figure 1) is rotated. An auxiliary frame 72 is vertically adjustable on the frame by means of a hand wheel 74.

A tooth traversing contactor 76 (Figure 2) is adjustably mounted in a lever 78 fulcrumed by a transverse pin 80 between centers 82 carried by the arms of a bracket 84 fastened to or formed integrally with the vertically adjustable frame 72. The lever 78 passes through an enlarged opening in the vertical wall of the bracket 84 and is formed at its outer end with a thrust ball 86 engaging and operating the transmitter of the pen driving telemeter unit, hereinafter to be described.

The disk 38 is urged into engagement with a frictionally effective driving bar 88, carried by the horizontally slidable frame 60, by means of a roller bearing 90 carried by a slide 92 urged by a spring 94 into engagement with the disk as the slide frame 24 is adjusted by means of a hand wheel 96. An angle indicating lever 98 (Figure 1) is frictionally clamped to the spindle and cooperates with a graduated scale 100 to indicate the angular movement of the gear or work piece during the testing operation.

In order to make a test, the frame 72 is adjusted vertically, by the hand wheel 74, properly to position the contactor on the surface of the tooth to be tested and the hand wheel 70 is hen rotated o cause horizontal movement of the frame 60 and the frame 72. This causes, through the frictionally effective driving bar 88, rotation of the base cylinder 38, the spindle 34 and the gear 40. On any deviation of the tooth surface from the true involute shape, the contactor 76 is swung on the pivot 82 in one direction or the other, depending on the direction of deviation of said surface from said true shape.

The telemetric recorder system, as shown in Figures 1 and 2, comprises a recorder 102 (Figure 1), a position responsive transmitter 104 (Figure 2) and a surface measuring transmitter 106 (Figures 1 and 2). The recorder 102 comprises a paper feed, telemetric receiver 108 which may comprise any suitable paper feed mechanism driven by an A. C. Selsyn motor, not shown, coupled through control unit 110 and cable 112 to the A. C. Selsyn generator 114 of the position responsive transmitter 104. The recorder 102 also comprises a pen driving telemetric receiver 116 forming with the telemetric transmitter 106 the pen driving telemeter system, the receiver 116 being connected to the transmitter 106 through the control unit 110 and a cable 118.

The control unit 110 may comprise any suitable conventional system of switches, rheostats and connectors for connecting and disconnecting the telemetric transmitters to and from the telemetric receivers and for calibrating and adjusting the pen driving telemetric receiver.

As shown in Figures 3, 4 and 5, the surface measuring telemetric transmitter 106 comprises a conventional dial indicator mechanism 120 having its dial and pointer removed. The mechanism 120 is mounted on an arm 122 which swivels upon the axis of a stud 124 (Figure 2) mounted upon the bracket 84 so that the mechanism may be moved from one side of the thrust ball 86 of the pin 78 to the other side thereof to enable testing of both surfaces of an involute tooth.

The rotary portion of the indicator mechanism 120 comprises a shaft 126 that responds by angular movement to the displacement of a plunger 128 which is spring pressed outwardly to engage the ball end 86 of the lever 78 to maintain the contactor 76 in engagement with the surface being tested. Although the shaft 126 may be coupled to the plunger 128 in any desirable manner, the coupling may be accomplished by an offset rack 127 formed integral with the plunger 128 and engaging a pinion 129 fixed to the shaft 126. The plunger 128 is maintained in engagement with the ball 86 by means of a spring 131 connected from the rack 127 to any convenient fixed point such as a stud 133 mounted on the upper plate 132 of the mechanism 120.

An electric generator or variable-ratio transformer 130 is mounted on the upper plate 132 of the mechanism 120 and enclosed in a casing 134 secured to the casing of the mechanism 120. The electric generator 130 comprises alternating current stator windings 136 wound on a laminated core 138 supported in any suitable manner on the plate 132 and having central core legs 140 between which is mounted, coaxially with the shaft 126, a rotor 142. The rotor 142 comprises a suitable coil 144 wound upon a core or form of insulating material secured at its lower end to a shaft 148 and at its upper end to a shaft 150.

The coil 144 is electrically connected at its opposite ends to the shafts 148 and 150. The shafts are journaled in a bracket 152. The bracket is formed of insulating material, or the shafts are journaled in insulating bushings mounted in bracket openings. Terminal screws 154 are connected to the output leads 156 and 158 (Figure 5), by wiper springs 160 which engage the shafts 148 and 150.

The shaft 148 is mechanically coupled to the shaft 126 of the mechanism 120 through a coupling sleeve 162 of insulating material. The shaft 150 projects through an enlarged opening in the dial plate 164 and carries a cooperating dial pointer or indicator 166. The dial plate 164 is calibrated in the same manner as the usual dial gauge so that the pointer 166, on movement of the plunger 128, indicates "positive" and "negative" deviations of the tooth surface from the true involute shape. An escutcheon 168 mounts a dial glass 170 on the casing 134.

The pen driving, telemetric receiver 116 comprises, as best shown in Figure 5, a pen driver unit or recorder 172 and a control unit or circuit 174. The pen driver unit or recorder comprises a driver section 176, mechanically connected to the pen 178 and an electric generator section 180 controlled by and responsive to the movement and position of the pen.

The pen driver section comprises two cylindrical armature coils 182 and 184 wound on, or mounted in, plastic cylinders slidably mounted on the opposite ends of a tube 186 of magnetically susceptible material press fitted or otherwise secured to the internal flange of a magnetically susceptible cylinder 188. The cylinder 188 is press fitted or otherwise secured to a permanent magnet 190 of cylindrical form, and which at its end abuts permanent magnet rings or pole pieces 192 and 194. The pole pieces 192 and 194 cooperate with the magnetically susceptible tube 186 to provide air gaps in which the armature coils 182 and 184 are movable by the interaction of the magnetic field created by currents flowing through the coils and the magnetic fields in the air gaps.

The coils 182 and 184 are provided with end caps 196 and 198 secured to a common shaft or rod 200 which passes through the magnetically susceptible tube 186 and projects from the end cap 198 of the coil 184. A brass rod 202 (Figure 10) is coupled in any suitable manner to one end of the shaft 200 and is formed at its outer end as a rack 204 slidably mounted in a guideway formed in a bracket 206 fastened to the end wall 208 of the cylindrical end casing 210 of the pen driver section.

Figure 6:
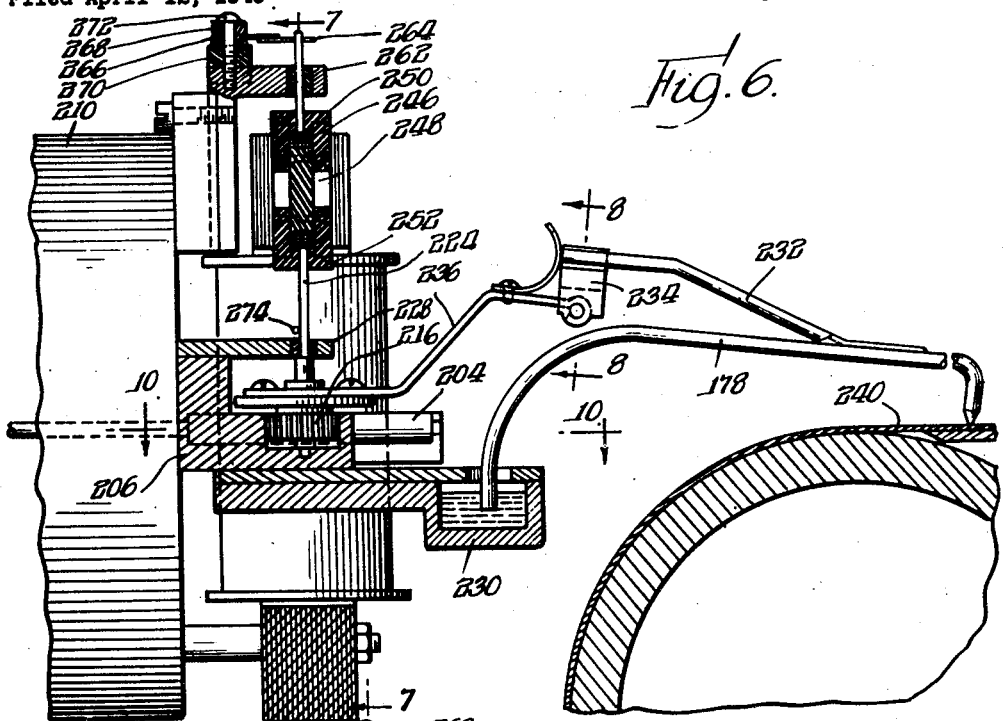
Figure 6 is an enlarged fragmentary view in vertical section taken substantially along the line 6—6 of Figure 5.
Figures 7, 8:
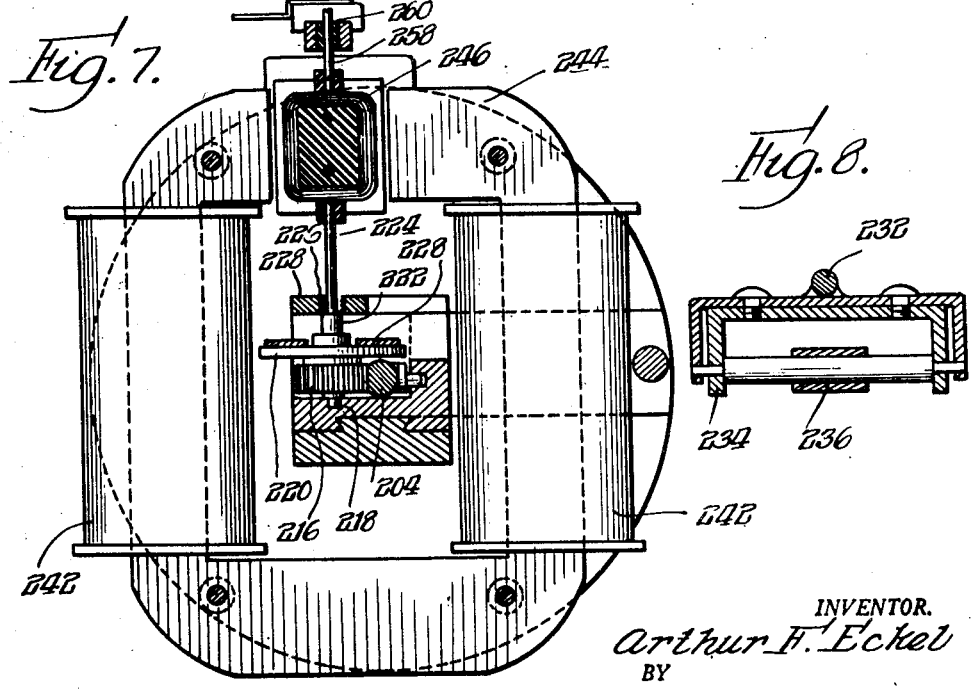
Figure 7 is a view in vertical section taken substantially along the line 7—7 of Figure 6.
Figure 8 is an enlarged fragmentary view in vertical section taken substantially along the line 8—8 of Figure 6.

The end casing 210 and a like, oppositely positioned, end casing 212 are fastened in any suitable manner to the magnet 190 and the pole pieces 192 and 194, and are mounted in any appropriate manner on a supporting base 214. The rack 204 meshes with a gear 216 (Figures 6, 7 and 10) secured to a shaft 218 secured to and depending from a disk 220. The disk is, in turn, coupled by an insulating coupler 222 (Figures 6 and 7) to a shaft 224 journaled in an insulating bushing 226 in a plate 228 fastened to the bracket 206.

The pen 178 is of conventional form and receives its supply of ink by capillary attraction from an ink well 230, into which the inner end of the pen dips, the ink well being mounted in any convenient manner on the bracket 206. The pen is received in and soldered to the tubular end of a holder 232 fastened to a block 234 pivoted for raising and lowering on the outer end of a mounting strip 236 of a form shown in Figure 11, the strip having a bifurcated inner end portion 238 permitting passage of the coupling 222, and is fastened to the disk 220 so that the strip swings as the disk is rotated and thereby causes horizontal movement of the pen over the record sheet 240.

The stator of the electric generator or variable-ratio transformer section 180 comprises coils 242 (Figures 5, 7, 9 and 10) wound on a laminated iron core 244 bolted to the end casing 210 of the pen driver section and formed in its upper leg with an air gap in which the rotor is received. The rotor comprises a coil 246 wound upon an insulating, preferably plastic, core form 248 to which are riveted, or otherwise fastened, upper and lower end plugs 250 and 252 (Figure 12) having depending leg portions received in slots 254 in the side walls of the core form, the end plugs being secured to the core form, as by rivets or other desirable fastening means 256.

The ends of the coil 246 are electrically connected to the shaft 224 and to a shaft 258, which are molded in, or secured in other manner, to the end plugs 250 and 252. The shaft 258 is journaled in an insulating bushing 260 (Figures 6 and 7) in the arm of a bracket 262 fastened to end casing section 210. Electrical connection is made to the shaft 258 through a wiper spring 264 (Figures 6 and 9) fixed to a terminal strip 266 mounted between an insulating sleeve 268 and an insulating block 270 secured to the bracket 262, as by a bolt 272. Electrical connection to the shaft 224 is made through a wiper spring 274 secured to a terminal screw 276 (Figure 5) mounted in any appropriate manner on the plate 228.

The control unit or circuit 174 (Figure 5) comprises a pair of electronic, gas discharge tubes or Thyratrons 278 and 280 having their anodes or plates 282 and 284 connected in parallel, and by wire 286 to the alternating current supply line L1. The cathode 288 of the tube 278 is connected by wire 290 of cable 292 to one end of the armature coil 184 of the pen driver, the other end of this coil being connected by wire 294 of cable 292 to one end of adjustable resistor 296 and one end of a fixed resistor 298. The other end of the adjustable resistor 296 is connected, as by wire 300, grounded as at 302, to the other alternating current supply line L2. The other end of the fixed resistor 298 is connected to the common plate lead 286. The resistors 296 and 298 constitute an adjustable voltage divider across the portion 298 of which the tube 278 is connected in series with the pen driver coil 184.

The cathode 304 of the tube 280 is similarly connected by wire 306 of cable 308 to one end of the pen driving armature coil 182, the other end of which is connected by wire 310 of said cable to one end of an adjustable resistor 312 corresponding to the resistor 206, and one end of a fixed resistor 314 corresponding to the fixed resistor 298. The other end of the resistor 312 is connected to grounded wire 300, and the other end of resistor 314 is connected to the plate lead 286.

The grid 316 of the tube 278 is capacitively coupled to the secondary 318 of an input transformer 320, the coupling comprising a condenser 322 connected in series with the secondary between the grid and the cathode of the tube, the secondary being shunted by a coupling resistor 324 and the grid being connected to the cathode by a grid resistor 326. The cathode 288 is grounded, as at 325, through condenser 327 which forms a grid biasing impedance or reactance and provides an out-of-phase A. C. grid bias voltage, as indicated in Figure 5A, to cause the tube 278 to operate at substantially the peak value of positive plate voltage when the system is in balance.

The grid 328 of the tube 280 is similarly capacitively coupled to the secondary 330 of input transformer 332 by a series condenser 334 and shunting resistors 336 and 338. The cathode 304 is grounded, as at 337, through condenser 399, similar to the condenser 327, to provide an out-of-phase A. C. grid bias voltage for the tube 280, as indicated in Figure 5A, so that this tube also operates at substantially the peak value of positive plate voltage when the system is in balance.

The grid biasing reactances 327 and 339 may be provided or augmented by the distributed capacity-to-ground of the secondary windings of the transformers 320 and 332, if the ground connections 325 and 337 are eliminated.

The primary windings 340 and 342 of the input transformers 320 and 332, respectively, are connected in series with the rotor coils 144 and 246 of the telemetric transmitter and the telemetric recorder, and a phasing or balancing condenser 344. Thus, one end of each of the primaries is connected directly to the condenser 344, while the other end of the primary 342 is connected by wire 346 and wire 348 of the cable 118 to the lead 156 from the rotor coil 144, and the other end of the primary 340 is connected by wire 350, wire 352 of cable 354, rotor coil 246, wire 356 of cable 354, wire 358, and wire 360 of cable 118 to the lead 158 from the rotor coil 144.

The stator coils 136 of the transmitter 106 are connected by cable 362 to the supply lines L1 and L2 and the stator coils 242 are similarly connected to their supply lines by cable 364.

The several coils of the electric generator or transformer section of the recorder and of the transmitter are so wound or connected that the output voltages of the rotor coils 144 and 246 are in phase opposition and the voltage impressed across the series circuit of the primaries 340, 342 and condenser 344 is the difference between the output voltage of the coil 144 and the output voltage of the coil 246.

The pen driver coils are so wound or connected that one tends to move the shaft 200 in one direction and the other tends to move it in the other direction. Thus the coil supplied with the greater average current determines the direction of movement of the shaft and, hence, the direction of swing of the pen 178.

The voltages P1 and P2 impressed on the plates of the tubes 278 and 280, and the grid bias voltages C1 and C2, are predetermined by selection and adjustment of the resistors 296, 298, 312 and 314 and the condensers 327 and 339. The adjustment is preferably such that the bias voltages C1 and C2 (Figure 5A) intersect the critical grid voltage curve at points F0 so that both tubes fire substantially at the mid-point of each positive half cycle of plate voltage when the output voltages of the coils 144 and 246 are zero or equal. Under these circumstances, the pulsating direct currents supplied to the driver coils 182 and 184 are instantaneously equal and the pen driving shaft 200 is, therefore, dynamically balanced and maintained at rest.

It is preferred to so orient the rotor coils 144 and 246 in respect to the needle of the transmitter and the pen of the recorder that when the needle and pen are in zero positions, the rotor coils are disposed parallel to the flux lines of their respective stator fields. Hence, when the needle and pen are in zero position, no voltage is induced in either of these coils and the pulsating currents supplied to the pen driver coils are of equal average value and the pen is dynamically balanced in its zero position.

The transformers 320 and 332 are so connected to the grid circuits of the tubes, and the condensers 322 and 334 are so adjusted or preset, that the operating or signal voltages impressed on the grids of the two tubes are of opposite phase and either substantially in phase or substantially 180° out of phase with the grid bias voltages C1 and C2. When the rotor of the transmitter is displaced with respect to the rotor of the recorder, the signal grid voltages E1 and E2, or E3 and E4, are impressed on the grids of the two tubes. The resultant grid voltages V1 and V2, or V3 and V4, intersect the critical grid voltage curves G1 and G2 at the firing points F1 and F2, or F3 and F4.

For example, let it be assumed that the rotor coil 144 is swung in a counterclockwise direction. The voltage V1 impressed on the grid of the tube 278 is then the resultant of the signal grid voltage E1 and the grid bias voltage C1 so that it fires at the point F1 in the early part of its positive half cycle while the grid voltage V2 impressed on the tube 280 is then the resultant of the signal grid voltage E2 and the grid bias voltage C2 so that tube 280 fires at the point F2 in the late part of each positive half cycle of plate voltage. A greater average current is, therefore, supplied to the coil 184 and a lesser average current supplied to the coil 182, and the shaft 200 is moved inwardly or to the left, as seen in Figure 5, to swing the pen 178 in a counterclockwise direction. If the rotor coil 144 had been instantaneously displaced a smaller angular distance, the tube 278 would have still fired in the first half of each positive half cycle of plate voltage but at a later instant, so that the average current in the coil 184 would not have been increased as much and, similarly, the average current in the coil 182 would not have been decreased as much. Hence a smaller net actuating force would have been applied to the pen driver shaft by the coils 182 and 184. When the rotor coil 144 is displaced in the opposite or clockwise direction, signal grid voltages E3 and E4 are applied to the tubes 278 and 280, respectively, and the resultant grid voltages V3 and V4 cause the tube 278 to fire at the point F3 and F4. Hence, the current in the coil 182 is now increased and the current in the coil 184 decreased so that the pen turns in a clockwise direction.

The rotor coil 246 is connected in phase opposition to the rotor coil 144, so that as it swings toward the position of the coil 144 it decreases the magnitude of the signal voltage impressed on the grids of the Thyratrons. Hence it delays the firing instant of the tube which is firing in the first half of its positive half cycle of plate voltage and advances the firing instant of the tube which is firing in the second half of its positive half cycle of plate voltage. Consequently, the net driving force exerted on the shaft 200 of the pen is decreased as the angular displacement between the needle of the transmitter and the pen of the recorder decreases.

When the pen reaches the same angular position as the needle of the transmitter, the signal voltage impressed on the grids of the tubes is reduced to zero and the currents in the driver coils become equal and the pen shaft is, therefore, dynamically balanced, and the pen forcibly held in the same position as the needle of the transmitter.

The operations of the control unit may be summarized as follows: Whenever the needle of the transmitter swings in a counterclockwise direction, with respect to the pen of the recorder, the tube 278 fires in the first part, or first 90°, of its positive half cycle of plate voltage, while the tube 280 fires in the later part, or between 90° and 180°, of its positive half cycle of plate voltage. Whenever the needle of the transmitter swings in a clockwise direction, with respect to the pen of the recorder, the tube 280 fires in the early part of its positive half cycle of plate voltage, while the tube 278 fires in the later part of its positive half cycle of plate voltage.

It is a features of the control unit shown in Figure 5 that the tubes operate at substantially the mid-point of each positive half cycle when no signal voltages are impressed on the grids. This follows from the fact that the grid bias voltages intersect the critical grid voltages of the tubes at substantially the peak value of the plate voltage. However, where maximum sensitivity is not required, the bias voltages may be made such that the tubes fire, in the absence of signal grid voltages, at other instantaneous values of plate voltage.

In lieu of the grid biasing reactances 327 and 339, the electric generator or transformer sections of the transmitter and recorder may be wound or adjusted, or suitable voltage dropping resistors and dividers employed, to create a predetermined signal voltage difference when the needle of the transmitter and the pen of the recorder are in the same angular positions.

Thus adjustable resistors 366 and 368 may be inserted in the leads to the stator coils of the transmitter and the stator coils of the electric generator section of the recorder, and voltage dividers 370 and 372 may be inserted in the output leads from the rotor coils of the transmitter and the recorder.

If high valued resistors of the "grid-leak" type are employed as the grid resistances 326 and 338, the grid biasing reactances 327 and 329 may be eliminated and the "free grid" potential, augmented by the negative charges electrostatically induced upon the grids and the coupling condensers during each negative half cycle of the plate voltage, relied upon to provide a D. C. bias for the tubes and cause operation of the tubes at substantially the peak value of the positive half cycle of plate voltage when no signal voltages are applied. In such case, the signal voltage also augments or reduces the D. C. bias during the negative half cycles of plate voltage and during the positive half cycles up to the instant of firing of the tubes. Hence, it has been observed, in this case, a smaller change in the amplitude of the signal voltage effects a still greater change in the firing periods of the two tubes and thereby produces a greater change in the average plate currents of the tubes for a given degree of movement of the transmitter needle. The control unit is, in this case, more sensitive to extraneous influences and shielding of components of the circuit, e. g., the transformers 320 and 332, may be required to obtain completely satisfactory operation in some installations.

In the form of the invention shown in Figure 5, the substantially fixed phase relations of the signal grid voltages to the common plate voltage determine which tube fires in the first half of its positive half cycle of plate voltage and which fires in the last half of its positive half cycle of plate voltage, but the amplitude of the signal grid voltages predominantly determines the amount of the change in the firing period of each tube.

Figure 14:
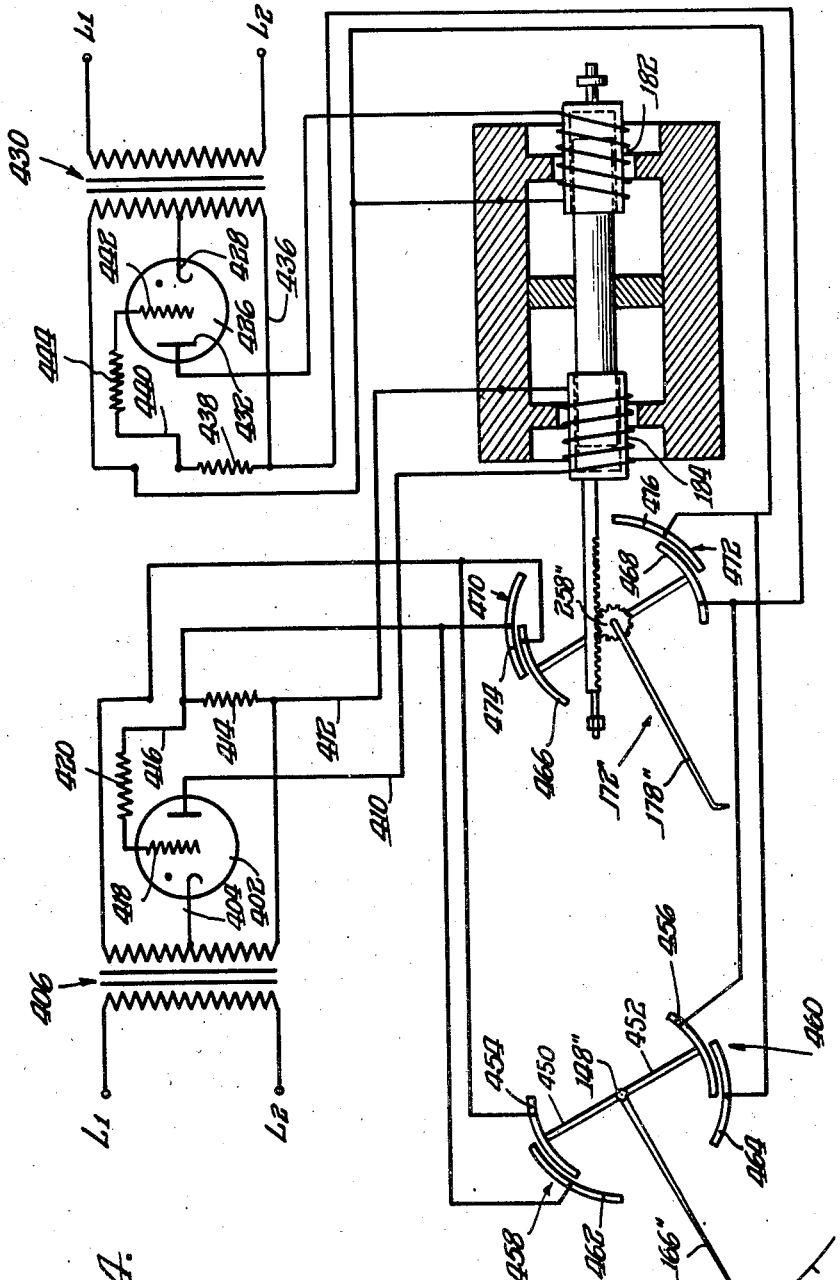
Figure 14 is another modified form of the pen controlling telemeter unit.

In the forms of the invention shown in Figures 13 and 14, the phase of the signal grid voltages relative to the plate voltage determines which tube fires in the first half of each positive half cycle of plate voltage, and that phase relation is varied to determine the change in the lengths of the firing periods of the tubes. Thus in the form of the invention shown in Figure 13, the telemetric transmitter 106' is provided with a shaft 148' which corresponds to the shaft 148 of the telemetric transmitter 106 and is angularly shifted by a displaceable member such as plunger 128. A movable coil 374, which cooperates with a stationary coil 376, is secured to the shaft 148'. These two coils form a variable inductance or reactance 377, the inductance value of which depends on the angular position of the coil 374 relative to the coil 376. The shaft 148' is connected through an insulating coupler 378 to a shaft 380 which carries a pointer 166' corresponding to the pointer 166 of the form shown in Figures 3 and 5. The shaft 380 also has secured to it a coil 382 which cooperates with the stationary coil 384. These two coils form a variable inductance or reactance 385, the inductance value of which depends on the angular position of the coil 382. The coils of each of the reactances 377 and 385 are so wound and connected, and the positions of the rotors so fixed on their respective shafts, that angular movement of the shafts in one direction causes an increase in one reactance and a simultaneous decrease in the other reactance.

The pen 178' of the recorder unit 172', shown in Figure 13, is mounted on a shaft 258', corresponding to the shaft 258 of the form shown in Figures 5 to 12, and this shaft has secured to it a coil 386 which forms, with a cooperating stationary coil 388, a variable inductance or reactance 389. The shaft 258' is connected by an insulating coupler 390 to a shaft 392 to which is secured a coil 394 which forms with the stationary coil 396 a variable inductance or reactance 397. The coils of each of the variable reactances 389 and 397 are so wound and connected, and so phased on their respective shafts, that as the reactance of one increases the reactance of the other simultaneously decreases.

The reactances 389 and 397 are so arranged with respect to the reactances 377 and 385, to which they are connected in parallel by cables 398 and 400, that changes in the reactances 377 and 385, caused by displacement of the shafts 148' and 380, are compensated for by opposite changes in the reactances 389 and 397 as the shafts 258' and 392 are swung by the pen driver section 172' to bring the pen 178' to the same position as the needle 166'.

The gas discharge tube or Thyratron 402 has its cathode 404 connected to the mid-point of the secondary winding of the alternating current supply transformer 406. The plate 408 of the tube 402 is connected by wire 410 to one end of the pen driver coil 184, the other end of which is connected by lead 412 to one end of the secondary winding of the supply transformer 406. A resistor 414 is connected between the other end of the secondary winding of that transformer and the lead 416 to the grid 418 of the tube 402. A grid resistor 420 is interposed in this lead 416. The parallel connected reactances 385 and 389 are connected to the grid lead 416 by wire 422 and to the lead 412 by wire 424. The resistance 414 and parallel connected reactances 385 and 389 comprise a phase shifting circuit which impresses on the grid of the tube a voltage which varies in phase, with respect to the plate voltage, on variation in the resultant reactance of the parallel connected reactances 385 and 389. The resistance and reactance of this phase shifting circuit are so proportioned that the tube 402 fires at the mid-point or peak value of each positive half cycle of plate voltage when the shafts of the transmitter and the recorder are in the same angular position.

A second gas discharge or Thyratron tube 426 has its cathode 428 connected to the mid-point of the secondary of a supply transformer 430. The anode 432 is connected by wire 434 to one end of the pen driver coil 182, the other end of which is connected by lead 436 to one end of the secondary winding of the transformer 430. The resistor 438 is connected between the lead 440 to the grid 442 of the tube 426 and the other end of the secondary winding of the transformer 430. A resistor 444 is inserted in the grid lead 440. The parallel connected reactances 377 and 397 are connected by wires 446 and 448 to the grid lead 440 and lead 436. The resistor 438 and parallel connected reactances 377 and 397 also form a phase shifting circuit impressing on the grid of the tube 426 a voltage which varies in phase, with respect to its plate voltage, on change in the resultant reactance of the parallel connected reactances 377 and 397. The resistance 438 and these reactances are so proportioned that the tube 426 also fires at the peak value of positive plate voltage when the transmitter and recorder shafts are at the same angular position.

It will be evident that when the shaft 148' of the transmitter is displaced, the reactances 377 and 385 change in opposite senses. Let it be assumed that the shaft 148' is displaced in such direction that the reactance 377 is decreased and the reactance 385 is increased. The decrease in the reactance 377 produces a shift in the phase of the grid voltage applied on the tube 426 relative to the plate voltage in such a direction that the tube 426 fires earlier than the instant when the peak value of positive plate voltage is attained in each alternating-current cycle. Thus, the tube 426 is rendered conductive for a longer period in each cycle, determined by the extent of the phase shift between grid and plate voltages, than would be the case if the testing and recorder members occupied corresponding angular positions. Conversely, the increase in the reactance 385 causes the phase of the grid voltage impressed on tube 402 relative to the anode voltage to be shifted in such a direction that tube 402 fires later in the cycle, after the positive plate voltage is past its peak value. Thus, tube 402 is rendered conductive for a shorter period during the alternating-current cycle than would normally be the case. As a result of the foregoing operation, the average current supplied to the driver coil 182 is increased and the average current supplied to the driver coil 184 is decreased, causing the indicator shaft 200 to move and to continue in motion so long as the unbalance of driving forces exerted by the respective coils 182 and 184 persists. The pen 178' is thereby swung in a direction to follow the movement of the needle 166' to cause the reactance 389 to decrease and the reactance 397 to increase. The movement of the pen is continued until the change caused in the reactance 389 is just sufficient to compensate for the change caused in the reactance 385 so that the phase of the grid voltage impressed on the tube 402 is advanced and the tube again fires at the peak value of positive plate voltage. This movement of the pen also causes the reactance 397 to increase sufficiently to compensate for the change in the reactance 377 and to retard the phase of the grid voltage impressed on the tube 426 so that this tube also again fires at the peak value of positive plate voltage.

In the form of the invention shown in Figure 14, the transmitter 106" has a shaft 148" which corresponds to the shaft 148 of the form shown in Figures 5 to 12 and to the shaft 148' of the form shown in Figure 13. This shaft has secured to it, by means of arms 450 and 452 which are insulated from the shaft, electrodes 454 and 456 of variable condensers or reactances 458 and 460. The electrodes 454 and 456 cooperate with stationary electrodes 462 and 464 of the condensers 458 and 460.

The recorder 172" has secured to its shaft 258", which corresponds to the previously described shafts 258 and 258', movable electrodes 466 and 468 of variable condensers or reactances 470 and 472. These electrodes cooperate with the stationary electrodes 474 and 476 of the variable condensers 470 and 472. The gas discharge tubes 402 and 426 are connected to the supply transformers 406 and 430 in the same manner as described with respect to Figure 13. In this case, however, the resistances 414 and 438 are connected in the grid-to-plate circuits, and the parallel connected condensers 458 and 470 are connected in the grid-to-cathode circuits.

The resistances and capacitive reactances are proportioned to cause the tubes to fire at the peak value of positive plate voltage when the needle 166" and the pen 178" are at the same angular position.

Displacement of the shaft 148" of the transmitter causes the grid voltages of the tubes 402 and 426 to be shifted in phase in opposite sense so that one tube fires earlier and the other fires later in its positive half cycle of plate voltage. The extent of this phase shift, and hence the change in the average current in each tube, depends, of course, on the extent of displacement of the shaft 148" relative to the shaft 258".

It will be evident that the response sensitivity of the recorder depends on the angle through which the transmitter shaft must be displaced in order to initiate movement of the recorder pen shaft and that the speed of response of the telemeter system depends on (1) the speed of response of the control unit and (2) the speed of response of the pen driver section of the recorder.

Since the tubes of the control unit fire, when the system is balanced, at substantially the peak value of plate voltage, and displacement of the transmitter shaft causes an increase in the current to one driver coil and a decrease in the current to the other driver coil, a very small displacement of the transmitter shaft is sufficient to initiate operation of the recorder pen shaft. Thus it has been found, in use, that a displacement of the transmitter shaft corresponding to a plunger displacement of $2 \times 10^{-5}$ inches is sufficient to cause operation of the recorder pen shaft.

The dynamically balanced, twin "voice coil" construction of the pen driver section of the recorder and the simultaneous opposite change of the currents in the coils assure substantially instantaneous response of the recorder pen shaft to the control unit.

The speed of response of the tubes of the control unit depends on the frequency of the supply voltage. The speed of response of the tubes will be of minimum value when the displacement of the transmitter shaft occurs at the instant that the plate voltage is passing through zero and building up in a negative direction. When the transmitter shaft is displaced, one or the other of the tubes responds in the first half of its positive half cycle of plate voltage. Therefore, if the frequency of the supplied voltage is 60 cycles per second, the maximum response time is $1/60$ of a second. If the displacement occurs during the positive half cycle of plate voltage, the control unit responds instantaneously, or within 1/240 of a second.

Where response within 1/240 of a second is required at all times, a second control unit of like construction may be employed. In such case, the second control unit may be connected to the transmitter and to the recorder in parallel to the first control unit, but connected to the supply line in opposed phase relation to the first control unit, so that the tubes of the second control unit fire during the time that the plate voltage of the tubes of the first unit is passing through its negative half cycle. In that case, one of the four tubes of the two control units will respond within 1/240 of a second to any movement of the transmitter shaft. When two control units are employed, the grounded connection 302 will, of course, be eliminated.

By employing frequency changing or multiplying circuits in the power supply, the speed of response may be increased as desired.

It is apparent from the foregoing description that I have provided a novel telemetering apparatus in which rotary circuit elements (such as the coils 144 and 246, Fig. 5, variable inductors 377, 385, 389 and 397, Fig. 13, or variable capacitors 458, 460, 470 and 472, Fig. 14) are interconnected by an electronic control circuit as 174, Fig. 5, or the equivalent thereof in Figs. 13 and 14, in such manner that the position of a recording member as 178 is caused to correspond with the position of a testing member as 76. The electronic control circuit, as explained hereinabove, utilizes gas tubes which respectively control the flow of current through the opposed driving coils as 182 and 184 that actuate the recording member. When the aforesaid rotary circuit elements respectively associated with the testing and recording members are in corresponding angular positions, the gas tubes have substantially equal firing periods. However, lack of correspondence in the angular positions of these rotary elements causes the grid voltages applied to the gas tubes to change in opposite senses (that is, vary oppositely in magnitude or phase) so that the firing periods of the gas tubes no longer are equal. This produces an unbalance in the opposing forces exerted by the driving coils upon the recording member, causing the recording member to assume a new position to restore the dynamic balance. It will be understood that while the invention has been shown as applied specifically to a surface testing and recording apparatus, it is capable of being adapted to a variety of uses. Thus, the testing member may be regarded broadly as a sensing device for ascertaining a measurable quantity; while the recorder is, in its broad aspect, a register to indicate the sensed quantity.

While certain specific structural details have been disclosed to illustrate certain embodiments of the invention, it will be apparent that other modifications and changes may be made without departing from the spirit and scope of the appended claims.

What I claim is:

1. In an electrically operated position tester and recorder which includes a movable testing member, a movable recording member, a telemetric transmitter having a rotary electric circuit element mechanically coupled to the testing member, a telemetric receiver having a rotary electric circuit element mechanically coupled to the recording member, and means for energizing said transmitter and said receiver from the same source of reference alternating-current voltage, the combination comprising a gas tube, means electrically coupling said gas tube to the reference voltage source, means electrically coupling said gas tube to both said rotary elements in opposed phase relation, whereby the firing time of said gas tube in each cycle of the reference voltage depends upon the angular position of the receiver rotary element relative to the transmitter rotary element, and a pair of opposed driving elements for said recording member, means for energizing one of said driving elements, the other of said driving elements being energized in response to said gas tube for at least a part of the energized period of said first named driving element to produce correspondence in the angular position of said receiver rotary element with respect to said transmitter rotary element responsive to a difference between the conductive period of said gas tube and a predetermined portion of each cycle of the reference voltage.

2. In an electrically operated position tester and recorder which includes a movable testing member, a movable recording member, a telemetric transmitter having a rotary electric circuit element mechanically coupled to the testing member, a telemetric receiver having a rotary electric circuit element mechanically coupled to the recording member, and means for energizing said transmitter and said receiver from the same source of reference alternating-current voltage, the combination comprising a pair of gas discharge tubes each having a control electrode, means connecting both said rotary elements to the control electrodes of said tubes in opposed phase relation in a common control circuit, means electrically coupling both said gas tubes to the reference voltage source with the same polarity, and a pair of opposed electric driving elements for said recording member controlled respectively by said tubes, whereby there is produced a net effective driving force on said recording members so long as said rotary elements are in dissimilar angular positions.

3. In an electrically operated surface tester and recorder which includes a movable testing member, a movable recording member, a telemetric transmitter associated with the testing member, a telemetric receiver associated with the recording member, and means whereby said transmitter and said receiver are energized by a source of reference alternating-current voltage, the combination comprising first and second gas tubes, each having a cathode, an anode and a control grid, first and second variable reactors in said transmitter, third and fourth variable reactors in said receiver, means connecting the grid and cathode of said first gas tube to said alternating current source and to said first and third reactors in parallel, means connecting the grid and cathode of said second gas tube to said second and fourth reactors in parallel, means connecting the anodes and cathodes of both said gas tubes to said alternating current reference voltage source, whereby the alternating current grid voltages of said tubes are oppositely controlled as to phase in relation to the alternating current anode voltages depending upon the angular position of the receiver rotary element relative to the transmitter rotary element, and a pair of opposed electric driving elements mechanically coupled to said recording member and controlled respectively by said first and second gas tubes to produce correspondence in the angular position of said receiver rotary element with respect to said transmitter rotary element in response to a difference in the respective conducting periods of said gas tubes during each cycle of the reference voltage.

4. The combination set forth in claim 3, wherein said reactors comprise variable inductors.

5. The combination set forth in claim 3, wherein said reactors comprise variable capacitors.

6. An electrically operated registering device comprising an axially movable indicator shaft, means providing a stationary magnetic field around said shaft, and a pair of separate axially movable coils disposed on and mechanically connected to said shaft, said coils being respectively adapted when individually energized to move said shaft in opposite directions.

7. An electrically operated registering device comprising an axially movable indicator shaft, means providing a stationary magnetic field around said shaft, a pair of separate axially movable coils disposed on and mechanically connected to said shaft, said coils being adapted when individually energized to move said shaft in opposite directions, and means responsive to a variable quantity to be registered for supplying electric currents of unequal values to said coils as an incident to, and determined by, variations in the value of such quantity.

8. In a position tester and recorder, alternating-current power supply means, means including a position responsive member for supplying alternating current varying in phase relative to said alternating-current power supply means and in magnitude with the position of said member, a recorder having a movable recorder member, and opposed driving elements connected to said recorder member, a pair of gaseous discharge tubes each having a controlled circuit and a control circuit, one of said driving elements being connected in the controlled circuit of one of said tubes and the other of said driving elements being connected in the controlled circuit of the other of said tubes, said controlled circuits of the tubes being connected to said power supply means in parallel, a pair of supply transformers having their secondaries in the control circuits of said tubes, said transformers having their primaries connected in series with said variable alternating current supply means and being phased to supply control voltages of substantially opposite phase to said tubes thereby to vary the firing period of said tubes in opposite senses in accordance with each change in the position of said position responsive member.

9. In a telemetric registering system, a telemetering transmitter including a variable ratio transformer, a telemetering receiver including a variable ratio transformer, a pair of gaseous discharge tubes each having a control circuit and a controlled circuit, means connecting the variable ratio transformers of the transmitter and the receiver in series opposition to the control circuits of said tubes whereby to vary the firing periods of said tubes in opposite senses, said telemetering receiver having opposed electrically operable driving elements, and means connecting one of said driving elements in the controlled circuit of one of said tubes and the other driving element in the controlled circuit of the other tube.

10. The combination in on electrical measuring and registering system of an indicator having a movable indicator member, opposed driving elements connected to said member, a pair of gaseous discharge tubes having output circuits in which said driving elements are connected and each having a control member, a variable ratio transformer having a movable ratio control element connected to said indicator member, a second variable ratio transformer having a movable ratio control element responsive to a quantity to be indicated, means for connecting the primaries of said transformers to a source of alternating current, and means for connecting the secondaries of said transformers in series opposition to the control members of said tubes to vary the control voltages impressed on said tubes in opposite phase.

ARTHUR F. ECKEL.

REFERENCES CITED

The following references are of record in the file of this patent:

UNITED STATES PATENTS

| Number | Name | Date |
|---|---|---|
| 363,333 | Hammer | May 17, 1887 |
| 473,539 | Weston | Apr. 26, 1892 |
| 812,196 | Evershed | Feb. 13, 1906 |
| 1,215,867 | Romain | Feb. 13, 1917 |
| 1,970,442 | Whittkuhns et al. | Aug. 14, 1934 |
| 2,085,128 | Staege | June 29, 1937 |
| 2,088,659 | Moseley | Aug. 3, 1937 |
| 2,165,510 | Rosene | July 11, 1939 |
| 2,206,852 | Poupitch | July 2, 1940 |
| 2,261,093 | Poupitch | Oct. 28, 1941 |
| 2,270,991 | Bagno | Jan. 27, 1942 |
| 2,357,524 | Klepp | Sept. 5, 1944 |
| 2,385,641 | Peterson | Sept. 25, 1945 |
| 2,420,539 | Hornfeck | May 13, 1947 |